Dec. 8, 1931. O. DOMRIES 1,835,208
DISK ATTACHMENT FOR RIDGING MACHINES
Original Filed June 29, 1928
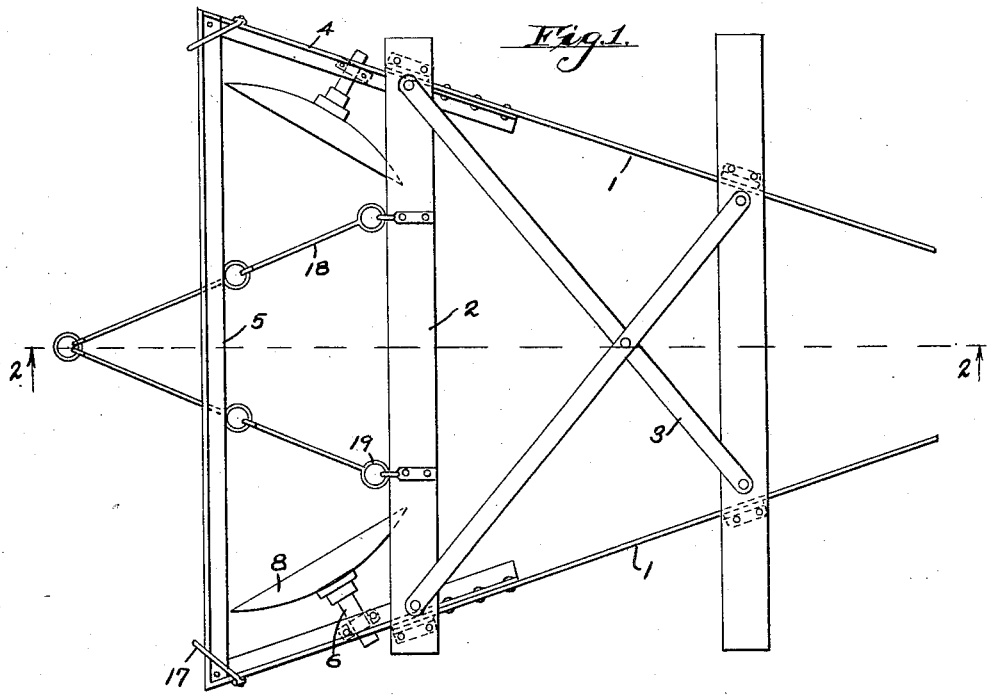
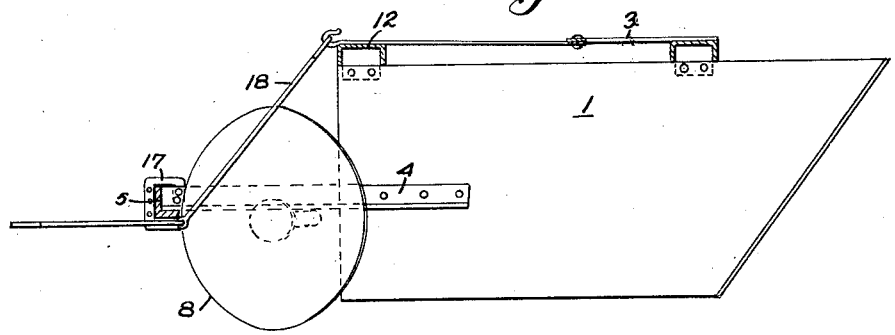
Inventor
Otto Domries
by Hazard and Miller
Attorneys Patented Dec. 8, 1931

1,835,208

UNITED STATES PATENT OFFICE

OTTO DOMRIES, OF SANTA ANA, CALIFORNIA

DISK ATTACHMENT FOR RIDGING MACHINES

Original application filed June 29, 1928, Serial No. 289,177. Divided and this application filed May 21, 1930. Serial No. 454,395.

This invention relates to a disk attachment for a ridger, the general object of the invention being to place a disk adjacent the front end of each runner or blade of the ridger so that the disks will cut furrows in the soil and throw the soil between them into a ridge, thus causing the runners or blades to enter the furrows and act to move the loose dirt inwardly and thus build up the ridge and pack the ridge thrown up by the disks.

An object of my invention is an attachment to be placed on the front of a ridger; this attachment having disks which cut and turn the earth inwardly, building up furrows and then the runners of the ridger follow in these furrows and build the loose dirt up into a higher and more compact ridge.

A further object of my invention is that in the use of the disks they will cut through hard and weedy soil, thus loosening the soil and hence by the use of my implement previous cultivation is unnecessary.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the improved ridger.

Figure 2 is a section on line 2—2 of Figure 1.

In these views, the numeral 1 indicates the two runners which are convergently arranged and which have their upper edges connected with the cross beams 2, these beams being connected together by the braces 3. In carrying out my invention, an angle iron bar 4 is fastened to the front end of each runner slightly below the longitudinal center thereof, these bars extending well in front of the runners and they are connected together at their front ends by the front cross angle bar 5.

Hooks or hitches 17 are fastened to the front corners of the frame formed by the bars 4 and 5 and these hooks are adapted to receive the draw chains for fastening the ridger to a tractor or the like, but when the ridger is to be pulled over ground which is not to be ridged, the draw chains 18 are fastened to the front beam 2, as shown at 19, and the chains are passed under the front bar 5 so that the front end of the ridger will be lifted as it is being pulled along and thus the disk and the front portions of the runners will be lifted off the ground and thus the device will be in inoperative position.

When the drawing or pulling chain is attached to the hooks or hitches 17 at the junction of the front cross bar 5 and the side bar 4, the pull on the tractor causes the disks to dig into the soil, forming a furrow and the runners 1 to follow in such furrow. When it is desired, however, to lift the disks, the draw chain may be attached as indicated at 19 in Fig. 2 and pass underneath the cross bar 5 and then by having a short connection to the tractor, the pull of the tractor lifts the disks and the front part of the runners above the ground so that these runners trail, riding on their rearwardmost edge. This prevents forming ridges.

There are disks 8 which are mounted in bearing members 6, these bearing members being secured to the angle bars 4, the disks being positioned to turn the soil inwardly.

From the foregoing it will be seen that this combination of V-shaped ridger with disks arranged in front of the blades of the ridger provides an agricultural implement whereby land can be ridged in a more simple and efficient manner than when the ridger is used alone or the disks are used alone. The disks will cut furrows and throw the loosened soil into a ridge and the runners will drop into the furrows and build the loose dirt up into a higher and more compact ridge. This implement saves times and labor as it performs the function of two different implements. The disks will cut through hard or weedy soil and loosen the soil and then the runners will build up the ridge formed by the disks and compact the same. With this implement, previous cultivation is unnecessary.

It is thought from the foregoing description that the advantages and novel features of my invention will be readily apparent.

It is to be understood that I may make changes in the construction and in the combination and arrangement of the several parts, provided that such changes fall within the scope of the appended claims.

This case is a division of my patent application for disk attachment for ridging machines, Serial No. 289,177, filed June 29, 1928.

I claim:

1. In combination with a ridger having runners, a frame connected with the front thereof and including side bars attached to the front ends of the runners of the ridger substantially at the longitudinal centers thereof and a cross bar connecting the front ends of the side bars together, disks rotatably connected with the side bars for forming furrows in front of the runners, hitches at the sides of the frame for attaching draw chains thereto, and means for attaching the draw chains to the front of the ridger and passing such chains under the front bar to lift the front part of the ridger to render the same inoperative when the implement is passing over ground which is not to be ridged.

2. In combination with a ridger having a frame with cross beams, runners converging from the front toward the rear and secured to said beams, an auxiliary frame having side bars connectible to the runners and extending forward, each side bar being in substantial alignment with the runner to which it is attached, a front cross bar connected to the side bars, axles secured to the side bars and a disk on each axle positioned in front of the runners and adapted to form a furrow for said runners, and means to connect draw chains to the front bar of the auxiliary frame or to the front beam of the ridger frame.

In testimony whereof I have signed my name to this specification.

OTTO DOMRIES.